United States Patent
Haas et al.

(10) Patent No.: US 7,410,526 B2
(45) Date of Patent: Aug. 12, 2008

(54) SYSTEM FOR THE PREPARATION OF AIR

(75) Inventors: Joachim Haas, Wangen (DE); Norbert Brutscher, Lindenberg (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 0 days.

(21) Appl. No.: 11/104,688

(22) Filed: Apr. 13, 2005

(65) Prior Publication Data
US 2007/0004326 A1 Jan. 4, 2007

(30) Foreign Application Priority Data
Apr. 13, 2004 (DE) .................. 10 2004 017 879

(51) Int. Cl.
*B64D 13/02* (2006.01)
(52) U.S. Cl. .................. 95/90; 96/108; 454/77
(58) Field of Classification Search ............ 96/4–14, 96/108, 121; 95/47, 54, 130, 138, 90; 454/76, 454/77; 244/129.2; 128/204.18, 205.27
See application file for complete search history.

(56) References Cited

U.S. PATENT DOCUMENTS

| | | | |
|---|---|---|---|
| 2,557,099 A | 6/1951 | Green | |
| 3,326,109 A | 6/1967 | Markham | |
| 4,262,495 A | 4/1981 | Gupta et al. | |
| 4,793,832 A * | 12/1988 | Veltman et al. .......... | 95/14 |
| 5,214,935 A * | 6/1993 | Brunskill ............... | 62/402 |
| 5,967,461 A * | 10/1999 | Farrington ............. | 244/118.5 |
| 6,408,641 B1 | 6/2002 | Skur, III | |
| 6,415,621 B2 * | 7/2002 | Buchholz et al. ........ | 62/402 |
| 6,527,228 B2 * | 3/2003 | Mitani .................. | 244/118.5 |
| 2003/0005719 A1 | 1/2003 | Mitani et al. | |
| 2003/0051500 A1 * | 3/2003 | Asfia et al. ............ | 62/402 |
| 2004/0025507 A1 | 2/2004 | Leigh et al. | |
| 2004/0112220 A1 * | 6/2004 | Defrancesco et al. ..... | 96/108 |

FOREIGN PATENT DOCUMENTS

| | | |
|---|---|---|
| EP | 1273514 | 1/2003 |
| EP | 1295789 | 3/2003 |
| EP | 1375349 | 1/2004 |

* cited by examiner

*Primary Examiner*—Frank M. Lawrence
(74) *Attorney, Agent, or Firm*—Dilworth & Barrese LLP (57) ABSTRACT

The present invention relates to a system for the preparation of air in an aircraft comprising a compressor charged with air on the inlet side, comprising a supply air heat exchanger which is downstream of the compressor, is charged with air compressed in the compressor on the pressurized air side on the inlet side and which is in communication on the pressurized air side on the outlet side with a system or unit which is to be supplied with pressurized air, and comprising a turbine which is charged on the inlet side with pressurized air from a pressurized air supply separate from the air supply of the compressor and is in communication on the outlet side with the low pressure side inlet of the supply air heat exchanger and which is in communication with the compressor such that the compressor can be driven by means of the turbine.

The invention furthermore relates to a method for the preparation of air in an aircraft.

27 Claims, 5 Drawing Sheets

Fig. 1

PRIOR ART

Fig. 2

PRIOR ART

SYSTEM FOR THE PREPARATION OF AIR

BACKGROUND OF THE INVENTION

The invention relates to a system for the preparation of air and to a method for the preparation of air in an aircraft.

Cooled pressurized air is required for the operation of oxygen and nitrogen generation units in aircrafts and for the operation of units in aircrafts with similar demands on the supply air.

The aircraft tanks fill up with a mix of kerosene vapor and air due to the removal of kerosene during the flight. With an unfavorable composition, an explosive mix can be created which ignites due to spontaneous ignition or is ignited by spark formation. To preclude this risk, it is proposed to reduce the oxygen content of the air in the kerosene tank. Investigations have shown that a spontaneous ignition of the mix can be reliably avoided by a reduction of the (normal) oxygen content of the air in the kerosene tank from 20.9% to approximately 12% to 14.5%. In addition to a low oxygen content, a high nitrogen content is advantageous to prevent a spontaneous ignition of the mix.

A unit is known from EP 1 375 349 A1 for the generation of nitrogen which will be termed an OBIGGS (on board inert gas generation system) in the following. This system uses a molecular sieve, whereby the largest portion of oxygen is filtered. A product gas with a greatly reduced oxygen content and a highly increased nitrogen content is created at the outlet side. This product gas can now be introduced into the kerosene tanks to preclude the risk of an ignition of the kerosene/air mix. Furthermore, the OBIGGS product gas can e.g. also be guided into freight spaces to minimize the risk of fire there.

The OBIGGS requires a supply with cooled pressurized air of approximately 50° C. to 90° C. Depending on the filter technology used and on the system size, the minimum supply pressure required amounts to approximately 1.8 bar (rel.) or 3.1 bar (rel.). According to the prior art, the supply of the OBIGGS takes place in that pre-cooled pressurized air (approximately 200° C. and 2 bar relative pressure) is guided out of the pressurized air bleeding system of the aircraft via a closable inlet valve (OSOV) into a special OBIGGS heat exchanger (OHX) and is there cooled according to the demands. The heat exchanger OHX is located in a ram air passage.

Figure 1:
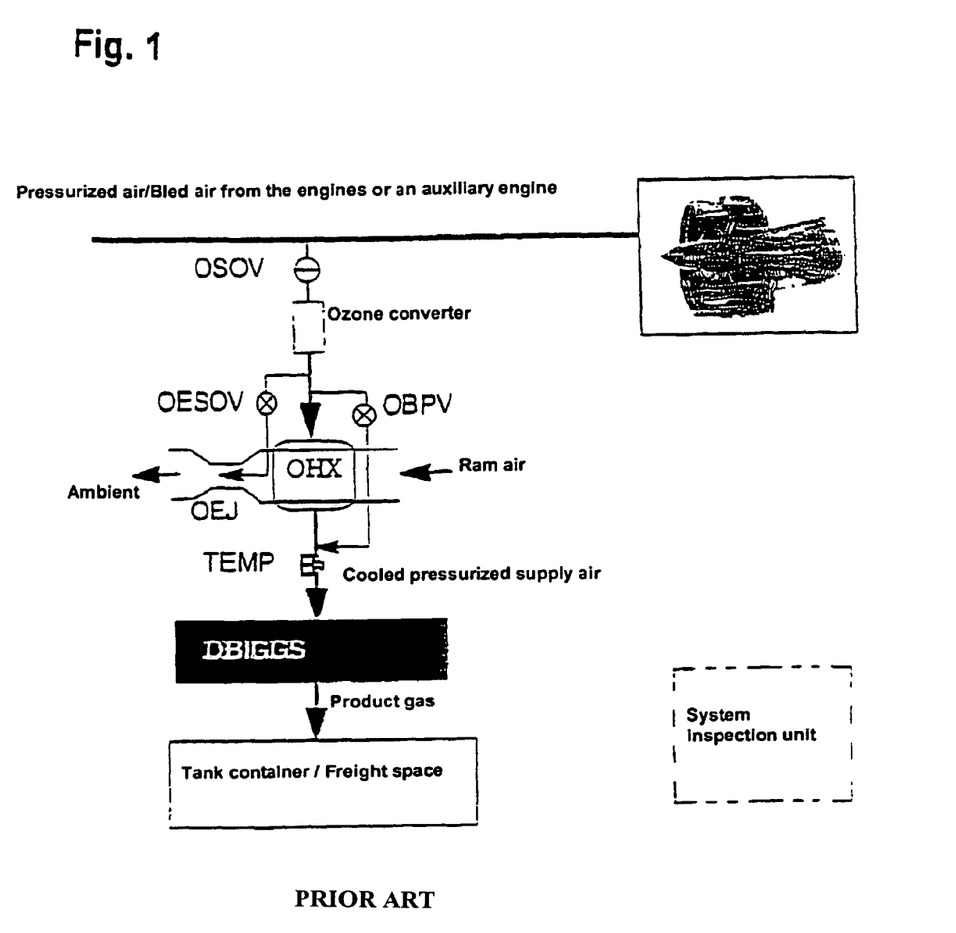
FIG. 1: a pressurized air preparation system in accordance with the prior art.

An already known system of this kind can be seen from FIG. 1. The oxygen is then filtered by the corresponding filter technology in the OBIGGS, whereby product gas is obtained with a nitrogen portion of >90%. It is then fed, as described above, to the tank containers and/or to the freight spaces. As can be seen from FIG. 1, an ozone converter is provided which is disposed upstream of the heat exchanger OHX on the pressurized air side. The ozone content of the ambient air and thus of the pressurized air increases with the flight altitude. The ozone can impair the action of the oxygen separation in the OBIGGS. This disadvantageous effect can be diminished or precluded by the ozone converter which reduces the ozone content.

As furthermore visible from FIG. 1, a valve OBPV is provided which is arranged in a bypass line which connects the inlet of the heat exchanger OHX on the pressurized air side with its outlet on the pressurized air side. Hot pressurized air is guided around the heat exchanger OHX by opening the valve OBPV. A specific minimum temperature of the cooled supply air can thereby also be set with cold ambient temperature (ram air temperature). Alternatively, a temperature control is also possible by a flap or a valve (not shown) in the ram air passage, whereby the ram air amount is reduced.

It is mostly necessary for the OBIGGS to be in operation during the whole flight. If the aircraft is on the ground, however, no ram air is present, i.e. the ram air for the cooling of the heat exchanger OHX must be generated otherwise or using corresponding means. This can be achieved, for example, by means of an ejector. Provision is made in this process for bled air to be guided via the open valve OESOV (see FIG. 1) and fed to a nozzle/ejector OEJ. The high discharge speed of the air at the nozzle effects an entrainment of the ambient air, whereby a ram air flow is generated which serves to cool the heat exchanger OHX. The necessary ejector air quantity amounts to approximately 60% of the OBIGGS supply air amount.

Alternatively, it is possible for this purpose for the ram air be generated on the ground by means of a blower in the ram air passage. For this purpose, a power supply and an inspection unit are required which are not shown in FIG. 1.

The following flow rates for the supply of an OBIGGS system are required for an aircraft with approximately 150 passengers:

Cooled OBIGGS pressurized supply air: approx. 100 g/s

Ram air: approx. 150 g/s to 200 g/s

Ejector (ground operation only): approx. 60 g/s.

A total of approximately 160 g/s pressurized air and, additionally, approximately 200 g/s ram air is thus required for the provision of 100 g/s OBIGGS pressurized supply air.

As mentioned above, OBIGGS systems are also known which require a higher supply pressure of at least approximately 3.1 bar (rel.). To balance this, the requirements of cooled pressurized supply air, however, only amount to approximately 35% (in this example thus approximately 35 g/s). Due to the higher pressure and the lower flow rate, this OBIGGS system has a smaller and lighter construction than that which works at lower pressures, but higher flow rates.

Figure 2:
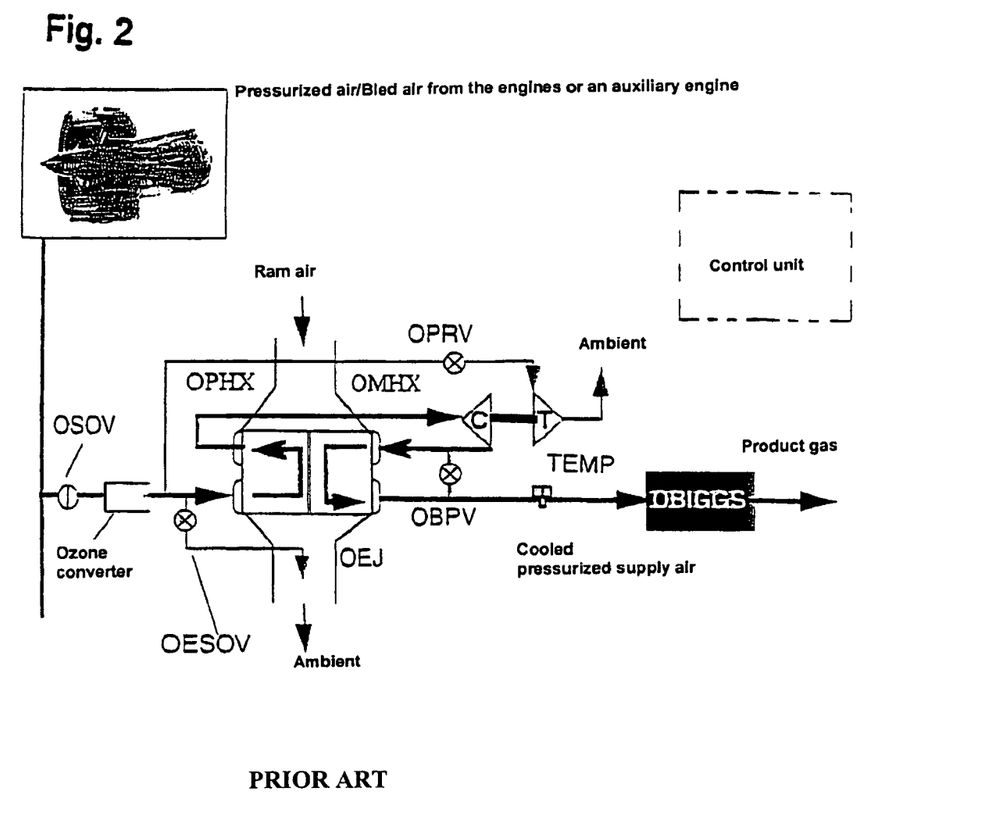
FIG. 2: a pressurized air preparation system in accordance with the prior art in a further embodiment.

One problem in the operation of OBIGGS systems of this kind which require a higher supply pressure of approx. 3.1 bar (rel.) consists of the fact that the level of the pressurized air supply of aircraft lies at approximately 2 bar (rel.) and thus well below the required 3.1 bar (rel.). To provide cooled pressurized air for this type of OBIGGS system, a compressor is thus required. FIG. 2 shows a corresponding architecture which is likewise known from the prior art.

Analog to the system shown in FIG. 1, pressurized air/bled air is supplied to the system via the open valve OSOV. The pressurized air flows through an ozone converter after passing through the valve OSOV. A heat exchanger (OPHX) is disposed upstream of the compressor so that temperatures do not arise in the downstream compressor C which are too high. After passing through the compressor, the pressurized air is cooled to approximately 75° C. in the heat exchanger OMHX and is supplied to the OBIGGS system. The heat exchangers OPHX and OMHX are cooled by ram air, as is shown in FIG. 2. On the ground, the ram air is generated by the ejector OEJ or by blowers. The driving of the compressor takes place by means of a turbine in which pressurized air is expanded which is branched off downstream of the ozone converter. For this purpose, the valve OPRV is opened and pressurized air is supplied to the turbine inlet.

Alternatively to this, the drive of the compressor can also take place by means of an electric motor such as is known from U.S. Pat. No. 4,681,602. The pressurized air for the turbine is thereby saved. However, the electric motor is relatively heavy in construciton and requires further components such as an energy supply (converter) and an inspection unit.

The systems known from the prior art in accordance with FIG. 1 and FIG. 2 are associated with the following disadvantages:

Ram air passage

An independent ram air passage, including the corresponding openings for inlet and outlet in the aircraft structure, is required for the ram air of the heat exchanger OHX (FIG. 1) or OPHX/OMHX (FIG. 2). The available space for freight is thereby reduced and the aircraft weight increased and additional costs are incurred. This disadvantage is made even larger if OBIGGS systems have to be retrofitted in existing aircraft. Fairly large modifications are required in order to subsequently integrate a ram air passage into the aircraft structure with new additional openings for the inlet and outlet.

Ram air flow

For reasons of cost and complexity, a flap at the inlet of the ram air passage is generally dispensed with. The disadvantage arises from this that the maximum ram air passage flow is always provided in flight even if a low ram air flow would be sufficient in specific flight phases or at a low ambient temperature. The ram air flow increases the aircraft kerosene consumption and thus the operating costs.

Ejector/Blower

The OBIGGS operation is generally also required on the ground. Since no ram air is available in this operating state due to lack of ram pressure, it must be actively conveyed. For this purpose, either a blower or, as shown in FIGS. 1 and 2, an ejector (OEJ and OESOV) are installed. Both variations are associated with costs and with weight disadvantages. Furthermore, an additional pressurized air requirement thereby results for the ejector or an additional electrical power requirement, if a ram air blower is alternatively used.

Ozone converter

Already known pressurized air preparation systems mostly require an ozone converter. The pressure losses generated in this process have to be compensated by smaller pressure losses in the following heat exchangers in order to ensure the same supply pressure for the OBIGGS system. The heat exchangers are thereby larger and heavier in construction. A further disadvantage is additionally the weight of the ozone converter.

Availability of pressure during descent

Depending on the required engine power, different pressures are available in the bled air system of the aircraft. The engine power is greatly reduced during the descent/landing approach, with relatively low pressures resulting from this.

The tanks of an aircraft are ventilated such that the same pressure results in the tank as in ambient. The ambient pressure increases during the aircraft descent. To match the internal tank pressure to the ambient pressure, the most air has to be supplied to the tanks in this phase. An OBIGGS system must therefore provide the maximum amount of nitrogen-enriched air in this phase and thus also generates the maximum demands on the OBIGGS pressurized supply air in this phase. Since the performance capability of the systems described in FIG. 1 and in FIG. 2 depends directly on the pressure of the bled air, the performance capability of the OBIGGS pressurized air preparation system is limited just in the phase of maximum demand. This has to be compensated by correspondingly larger dimensioned components, with correspondingly disadvantages with respect to weight, construction space and costs resulting from this.

The disadvantages described above apply equally to the systems from the prior art shown in FIG. 1 and in FIG. 2.

The following additional disadvantages result from the system shown in FIG. 2:

With the system described in FIG. 2, the advantage initially results with respect to the system that higher pressures can be achieved for the OBIGGS supply. The required amount of cooled supply air is thereby substantially reduced and a more efficient OBIGGS system can be used. This advantage is, however, eliminated again for the following reasons:

An additional component is required with the compressor; a drive is required for the compressor which, in the case of a turbine, requires additional pressurized air from the bled air system. Pressurized air is thus required for the actual OBIGGS supply and for the drive of the turbine and for the ejector for the generation of ram air, i.e. cooling air, in ground operation;

an additional heat exchanger (OPHX) is required, with the corresponding disadvantages with respect to construction space and weight;

due to the smaller required OBIGGS supply air amount (at a higher supply pressure), the required ram air flow could generally be reduced. However, this is negated by the ram air amount which the additional OPHX needs.

SUMMARY OF THE INVENTION

It is the underlying object of the present invention to provide a compact and efficient system for air preparation in an aircraft.

This object is satisfied by the features described herein.

Advantageous aspects of the invention are also the subject herein.

In accordance with the invention, a system is provided for the preparation of air in an aircraft comprising a compressor charged with air on the inlet side, comprising a supply air heat exchanger which is downstream of the compressor, is charged on the pressurized air side on the inlet side with air compressed in the compressor and which is in communication on the pressurized air side on the outlet side with a system or unit which has to be supplied with pressurized air and comprising a turbine which is charged on the inlet side with pressurized air from a pressurized air supply separate from the air supply of the compressor and is in communication on the outlet side with the low-pressure side inlet of the supply air heat exchanger and which is in communication with the compressor such that the compressor can be driven by means of the turbine.

A system of this kind for air preparation has the advantage that no ram air is required for the cooling of the supply air, whereby a ram air passage with corresponding openings in the aircraft structure provided separately in accordance with the prior art can be omitted. This is in particular of advantage if an OBIGGS system is retrofitted in existing aircraft types. The weight and the construction space of the ram air passage are saved and, in addition, the increase in the aircraft resistance due to the ram air flow is avoided. The installation position for the system can also be chosen more flexibly due to the independence from a ram air passage.

A further advantage of the system in accordance with the invention consists of the fact that no ejector or ram air blower is required to generate ram air in ground operation. Components (ejector valve, ejector and lines or blower and power supply with control) are thereby saved and the requirement of pressurized air or electrical power is reduced. The savings in pressurized air and electrical power is in particular of advantage, since the bled air and the electrical power are generated by an auxiliary engine which can only generate approximately 90% of the normal bled air amount of the engines on the ground, when the engines are still switched off.

In contrast to the system from the prior art shown in FIG. 1, the system in accordance with the invention can also achieve high supply pressures of approximately 3.1 bar (rel.). As described above, at higher pressures, much lower OBIGGS supply air amounts (mass flow) are sufficient (approximately 35%). Due to the low flow rate and the simultaneously higher pressure, the volume flow to be conveyed to the OBIGGS is only 20% in comparison with the system from the prior art shown in FIG. 1. The construction size of components such as the heat exchanger and the compressor is substantially a function of the volume flow. These components therefore have a substantially smaller and lighter construction size. The system in accordance with the invention can have a very compact construction with minimum outside dimensions.

In a further aspect of the invention, provision is made for the compressor to be charged on the inlet side with air from a pressurized space, preferably with cabin air. Air from other pressurized spaces of an aircraft can also be used in this aspect of the invention. Fresh air is typically supplied to the cabin from the bled air system via the air-conditioning system of the aircraft. Ozone converters are as a rule disposed upstream of the air-conditioning system. The cabin air is therefore already ozone-filtered. The system in accordance with the invention in this embodiment sucks in OBIGGS supply air from the cabin by means of the compressor. The ozone converter can thus be omitted. In addition to the reduction in weight and cost, the pressure losses and thus the required compressor performance/pressure increase are also reduced. Secondary advantages result from this such as a lower pressure requirement at the turbine inlet and smaller heat exchangers due to the lower compressor outlet temperature.

As stated above, the engine performance and thus the supply pressure in the bled air system is substantially reduced during the aircraft descent from the cruising flight altitude or in the approach descent. At the same time, however, this flight phase requires the maximum flow rates of the OBIGGS system and thus also of the OBIGGS pressurized air supply. Due to the fact that the system in accordance with the invention in this preferred embodiment sucks in air from the cabin whose pressure is above the ambient pressure, the system in accordance with the invention can also supply sufficiently compressed and cooled supply air in flight even with a reduced bled air pressure.

In a further aspect of the present invention, provision is made for the turbine to be charged on the inlet side with bled air from the engines or from an auxiliary unit of the aircraft.

A pressurized air heat exchanger can be disposed upstream of the turbine on the pressurized air side for the cooling of the pressurized air supplied to the turbine. The former can be disposed downstream of the supply air heat exchanger on the low pressure side so that the turbine outlet air first flows through the supply air heat exchanger and then through the pressurized air heat exchanger. The pre-cooling of the pressurized air supplied to the turbine reduces the turbine outlet temperature and thus the outlet temperature of the supply air heat exchanger at the pressurized air side.

Provision is made in a further aspect of the invention for the pressurized air heat exchanger to form a construction unit with the supply heat exchanger and to be separate from it on the pressurized air side. Provision is made alternatively to this for the heat exchangers to be separate mechanically and on the pressurized air side.

In a further aspect of the invention, a bypass line is provided which can be closed by means of a valve and which connects the inlet of the pressurized air heat exchanger on the pressurized air side with its outlet on the pressurized air side. In this manner, a specific minimum temperature of the cooled supply pressurized air can be set at a low temperature of the pressurized air from the bled air system.

Furthermore, a bypass line can be provided which can be closed by a valve and which connects the inlet of the supply air heat exchanger on the pressurized air side with its outlet on the pressurized air side. An embodiment of this kind also serves the temperature control of the supply air which is to be supplied to the system or unit disposed downstream of the supply air heat exchanger on the pressurized air side.

Provision can furthermore be made for the compressor to be made in one or more stages and/or for one or more compressors to be provided.

The outlet air of the heat exchanger(s) on the low pressure side can be discharged to ambient by means of a line or can be introduced into the ram air passage of an aircraft air-conditioning system.

In a further aspect of the invention, a valve is provided by means of which the pressurized air flow supplied to the turbine can be changed or blocked. In specific flight phases such as the start, relatively high pressure can occur in the bled air system. This results in a high turbine power and thus also a high compressor power. To prevent extreme temperatures at the compressor outlet in this process, the pressure of the pressurized air supplied to the turbine can be limited by a partial closing of this valve.

In a further aspect of the invention, a valve is provided by means of which the air flow supplied to the compressor can be changed or blocked.

In a further aspect of the invention, the compressor and the turbine form a shaft device with a common shaft. This two-wheeled machine can be fitted with a motor which is connected to the compressor and to the turbine by the shaft. In the case of particularly low bled air pressures, the too low a shaft performance of the turbine can thus be compensated.

Provision can furthermore be made for the shaft device and the heat exchanger(s) to form a common mechanical unit or, alternatively to this, be mechanically separate from one another.

The invention further relates to a method for the preparation of air in an aircraft in accordance with the description herein. Provision is made for air to be compressed in a compressor, for the compressed air to be cooled on the pressurized air side of a supply air heat exchanger and then to be supplied to a system or unit which is to be provided with pressurized air, with the cooling of the air compressed in the compressor taking place by air which is supplied to a turbine by a pressurized air supply separate from the air supply of the compressor, expanded in it and supplied to the low pressure side of the supply air heat exchanger, and the turbine power arising on the expansion of the pressurized air being utilized at least in part to drive the compressor.

Advantageous aspects of the method are also the subject herein.

BRIEF DESCRIPTION OF THE DRAWINGS

Further details and advantages will be explained in more detail with reference to an embodiment shown in the drawing. There are shown.

DESCRIPTION OF THE PREFERRED EMBODIMENTS

Figure 3:
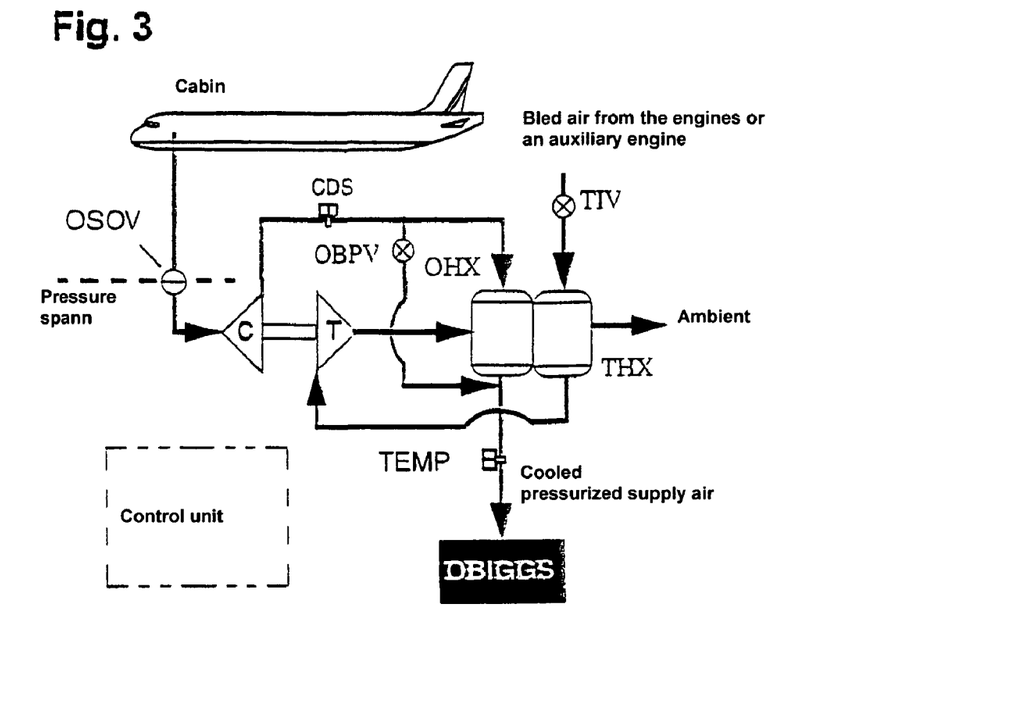
FIG. 3: a pressurized air preparation system in accordance with the invention without a ram air passage with OBPV temperature control.

The pressurized air preparation system in accordance with FIG. 3 has the following components:

A two-wheel cooling turbine with a compressor C and a turbine T is provided. Furthermore, a line is provided which leads from the pressurized cabin to the compressor inlet and which can be closed by the valve OSOV. The supply air heat exchanger OHX is connected on the pressurized air side on the inlet side to the compressor and on the pressurized air side on the outlet side to the OBIGGS system to be supplied. A line is furthermore provided which leads from the bled air system to the inlet of the heat exchanger THX on the pressurized air side, with this line being able to be closed by the valve TIV. A further line connects the outlet of the heat exchanger THX on the pressurized air side to the inlet of the turbine. Furthermore, a line is provided which connects the inlet of the heat exchanger OHX on the pressurized air side to the outlet of the heat exchanger OHX on the pressurized air side and which can be closed by means of the valve OBPV. Finally, a line is provided which connects the outlet of the turbine T to the low pressure side inlet of the supply air heat exchanger OHX. The pressurized air heat exchanger THX is disposed downstream of the supply air heat exchanger OHX on the low pressure side and can form a common heat exchanger unit, albeit separate on the pressurized air side, with the supply air heat exchanger OHX. A line from the outlet of the pressurized air heat exchanger THX on the low pressure side leads to ambient or to the ram air outlet passage of an air-conditioning unit of the aircraft.

The line system comprising the turbine T is separate from the line system comprising the compressor C. The component present in both systems is the supply air heat exchanger OHX through which air compressed in the compressor flows on the pressure side and through which turbine outlet air flows on the low pressure side.

The function of the system shown in FIG. 3 is as follows:

Cabin air of approximately 25° C. and 1 bar is sucked in by the compressor C and compressed to approx. 3.1 bar (rel.) (ground operation). A pressure of approximately 4.1 bar (absolute) is therefore present at the compressor outlet side.

The air is then cooled to approximately 75° C. in the supply air heat exchanger OHX and subsequently supplied to the OBIGGS system or to another system with similar supply air demands. The extraction of the cabin air can take place, for example, in the inlet region of the outlet flaps and outlet valves of the cabin pressure control. The required air quantity amounts to approximately 3% of the fresh air amount constantly supplied to the cabin. It results from this that the influence on the cabin pressure control and cabin leakage is negligibly low.

Pressurized air/bled air of approximately 200° C. and 2 bar (rel.) is supplied to the pressurized air heat exchanger THX and is cooled to approximately 150° C. This air is then expanded in the turbine T and cooled to approximately 50° C. This temperature level is sufficient to cool the compressor outlet air from approximately 210° C. (CDS) to approximately 75° C. (TEMP) in the subsequent supply air heat exchanger OHX. A temperature results at the low-pressure side outlet of the supply air heat exchanger OHX of approximately 120° C. which is sufficient to cool the pressurized air of the bled air system of approximately 200° C. to around 150° C. in the following pressurized air heat exchanger THX. The outlet air of the pressurized air heat exchanger THX on the low pressure side is finally guided to ambient, e.g. via the ram air outlet passage of the air-conditioning system of the aircraft which is anyway present. The arising shaft power of the turbine T is utilized to drive the compressor C.

The flow rate of the turbine T amounts approximately to twice the demanded OBIGGS supply air amount.

As can be seen from FIG. 3, a bypass line is provided which connects the inlet on the pressurized air side to the outlet of the supply air heat exchanger OHX on the pressurized air side. A valve OBPV is provided in this line. By the opening of this valve, hot air compressed in the compressor C is guided around the heat exchanger OHX. A specific minimum temperature TEMP of the cooled OBIGGS pressurized supply air can thereby also be set at a low turbine outlet temperature (due to a low temperature of the pressurized air of the bled air system).

Figure 4:
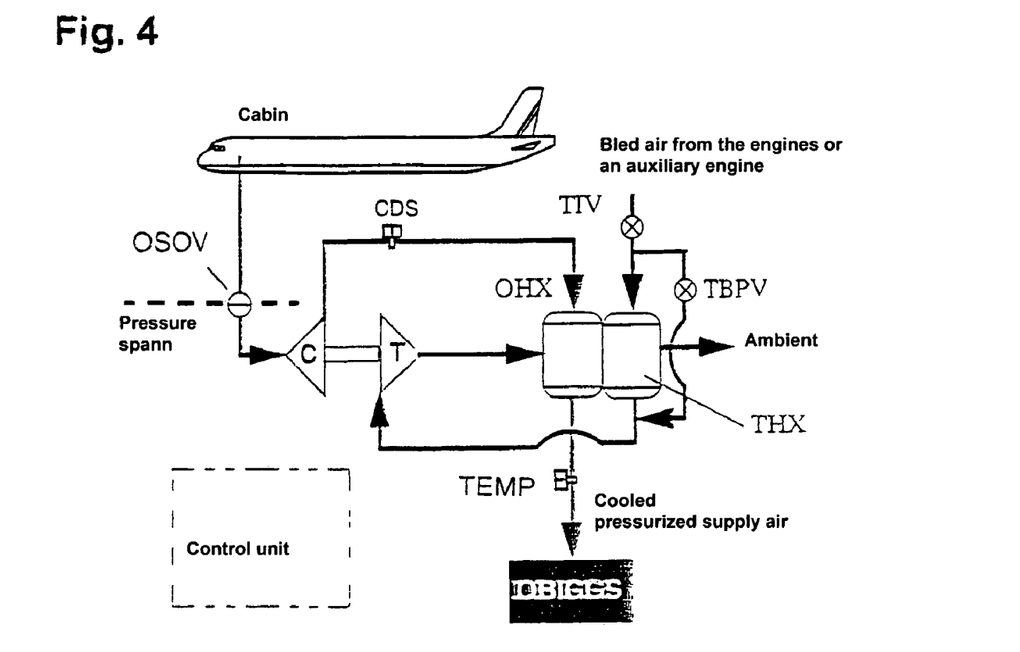
FIG. 4: a pressurized air preparation system in accordance with the invention without a ram air passage with TBPV temperature control.

An alternative method for the temperature control of the OBIGGS supply air results from FIG. 4. The OBIGGS supply air is to be understood as the outlet air of the supply air heat exchanger OHX on the pressurized air side. In this alternative method for the temperature control, the inlet of the pressurized air heat exchanger THX on the pressurized air side is connected to the outlet of this heat exchanger on the pressurized air side, as can be seen from FIG. 4. This bypass line can be closed by the valve TBPV. By the opening of this valve, hot pressurized air is guided around the pressurized air heat exchanger THX. A higher turbine inlet temperature or a higher turbine outlet temperature, and ultimately a higher temperature TEMP of the OBIGGS supply air, thus results.

The method explained with reference to FIG. 4 by means of the valve TBPV has the advantage over the temperature control method in accordance with the FIG. 3 using the valve OBPV that, with a reduced bled air temperature, i.e. with a reduced inlet temperature of the heat exchanger TX on the pressurized air side, the bled air supplied to the turbine T is pre-cooled less in the pressurized air heat exchanger THX. The pressure performance present at the turbine inlet is thereby higher, whereby a lower pressure requirement results for the turbine T. The higher the temperature at the turbine inlet, the lower the required pressure at the turbine inlet to achieve the same shaft performance. This is in particular of advantage during the descent phase of the aircraft, since here lower bled air temperatures and bled air pressures can occur, which is due to the reduced engine power.

In specific flight phases, such as at the start, relatively high pressures can occur in the bled air system. This results in a high turbine performance and so a high compressor performance. To prevent extreme temperatures (CDS) at the compressor outlet, the pressure of the pressurized air supplied to the turbine T can be limited by partial closing of the valve TIV.

The system in accordance with the invention is connected to an inspection unit for the monitoring of the control.

Figure 5:
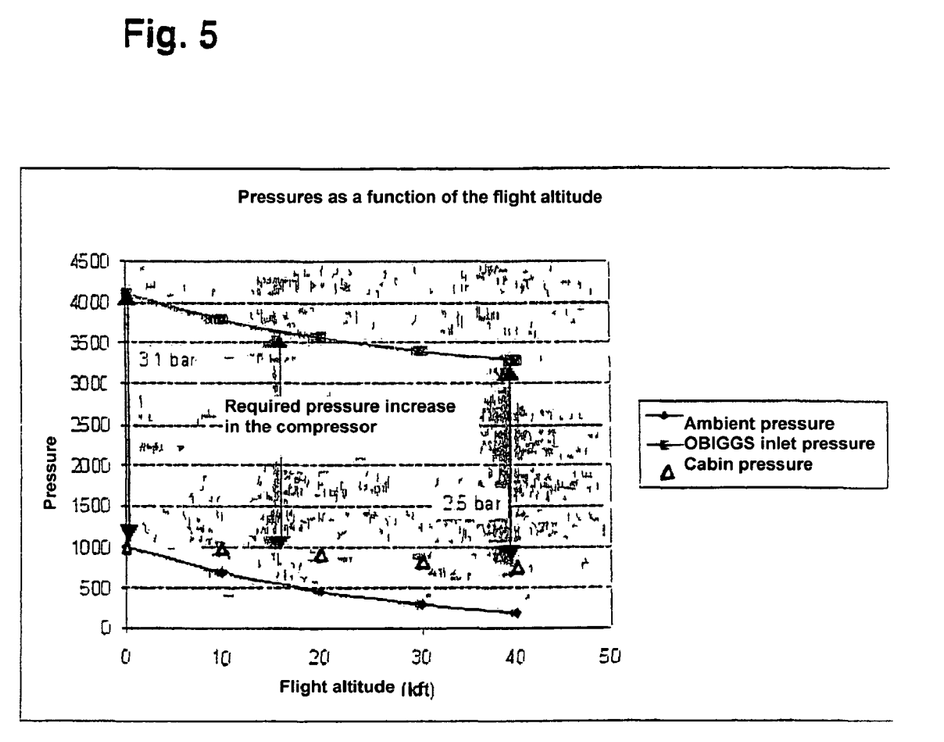
FIG. 5: pressures as functions of the flight altitude.

As the flight altitude increases, the ambient pressure reduces considerably, as can be seen from FIG. 5. The cabin pressure is, however, reduced considerably less. With an ambient pressure of approximately 200 hPa at a flight altitude of 38,000 ft., the cabin pressure still amounts to 800 hPa. The pressure demands for the OBIGGS supply air are relative to the ambient pressure. Since the compressor C sucks in air from the cabin in an advantageous embodiment of the invention, the required compressor power falls correspondingly as the flight altitude increases, since the pressure difference between the OBIGGS supply air and the cabin air falls. Parallel to this, the pressurized air demand of the turbine to drive the compressor falls.

While the compressor produces a pressure increase of approximately 3.1 bar on the ground, a pressure increase of only 2.5 bar is necessary at a flight altitude of 40,000 ft., as can be seen by way of example from FIG. 5. With the smaller required compressor performance, the compressor outlet temperature, and thus the outlet temperature of the supply air heat exchanger OHX on the pressurized air side, also falls from approximately 75° C. to approximately 50° C. It thus results that a certain performance reserve is present in flight with respect to the supply temperature.

In the future, further developed filter technologies are to be expected for OBIGGS systems which work efficiently at higher supply air temperatures of approximately 100° C. to 140° C. The system described with respect to FIGS. 3 and 4 can be further simplified for the supply of systems of this kind or systems with similar supply air demands, since in this case the pressurized air heat exchanger THX is no longer required. An architecture of this kind can be seen from FIG. 6. In this system, the air from the bled air system is supplied to the turbine directly without pre-cooling via the open valve TIV. An OBIGGS supply air temperature of approximately 110° C. (ground operation) to approximately 90° C. (flight operation) thus results with an unchanged supply pressure of 3.1 bar (rel.).

Figure 6:
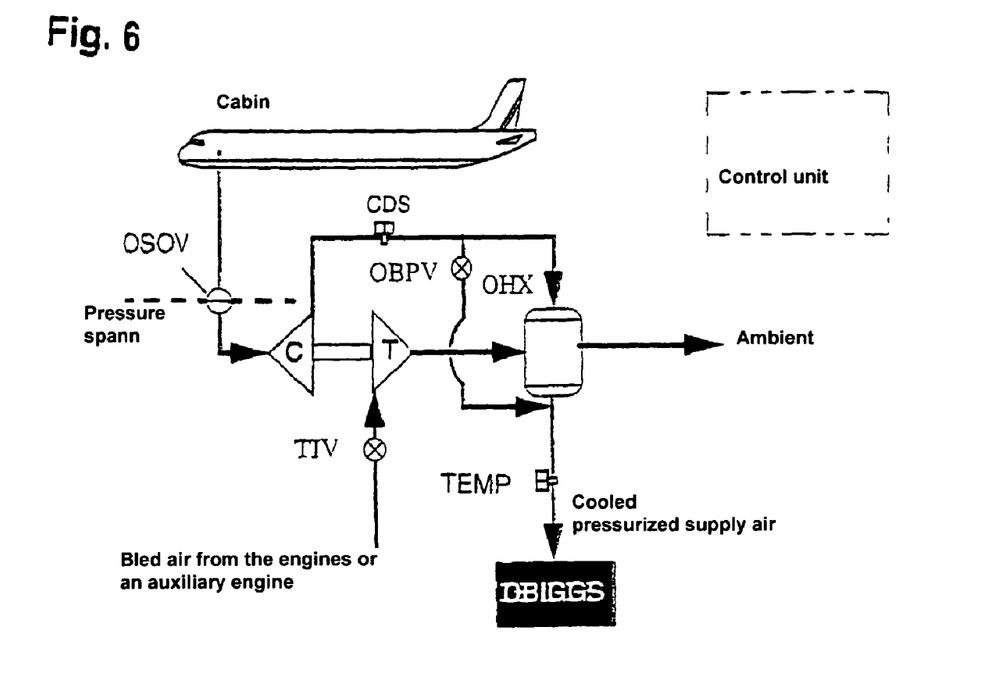
FIG. 6: a pressurized air preparation system in accordance with the invention without a ram air passage with only one heat exchanger OHX.

The pressurized air preparation system in accordance with FIG. 6 accordingly manages with only one heat exchanger OHX which serves the cooling of air compressed in the compressor C by means of turbine outlet air.

Figure 7:
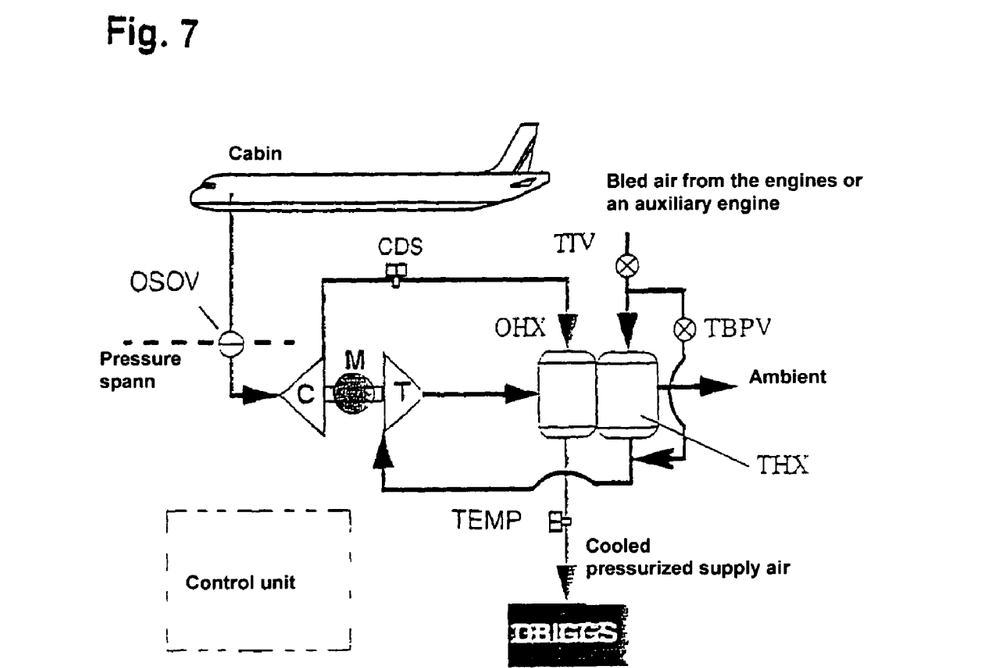
FIG. 7: a pressurized air preparation system in accordance with the invention without a ram air passage with a powered two-wheel cooling turbine.

In a further aspect of the invention, the two-wheel machine with a compressor C and a turbine T can additionally have a motor M which is connected to the compressor C and the turbine T by a shaft, as results from FIG. 7. In the case of particularly low bled air pressures, the too low a shaft performance of the turbine can be compensated, i.e. the turbine performance can be supplemented by the corresponding motor performance.

The architecture described in the Figures was represented with reference to a supply of an OBIGGS system. The pressurized air preparation system without ram air passage in accordance with the invention can naturally also be used for the supply of other systems which make comparable demands on the compressed air to be supplied.

In summary, it results that the air requirement can be reduced by the system in accordance with the invention by 60% to 65%.

The invention claimed is:

1. A system for the preparation of air in an aircraft comprising a compressor (C) charged with air on the inlet side, comprising a supply air heat exchanger (OHX) which is downstream of the compressor (C), is charged with air compressed in the compressor (C) on the pressurized air side on the inlet side and which is in communication on the pressurized air side on the outlet side with a system (OBIGGS) or unit which is to be supplied with pressurized air, and comprising a turbine (T) which is charged on the inlet side with pressurized air from a pressurized air supply separate from the air supply of the compressor (C) and is in communication on the outlet side with the low pressure side inlet of the supply air heat exchanger (OHX) and which is in communication with the compressor (C) such that the compressor (C) can be driven by the turbine (T), wherein a pressurized air heat exchanger (THX) is disposed upstream of the turbine (T).

2. A system in accordance with claim 1, wherein the compressor (C) is charged on the inlet side with air from a pressurized space of an aircraft, preferably with cabin exhaust air.

3. A system in accordance with claim 1, wherein the pressurized air supplied to the turbine (T) is bled air from the engines or from an auxiliary unit of the vehicle.

4. A system in accordance with claim 1, wherein the pressurized air heat exchanger (IHX) is disposed downstream of the supply air heat exchanger (OHX) on the low pressure side so that the turbine outlet air first flows through the supply air heat exchanger (OHX) and then through the pressurized air heat exchanger (THX).

5. A system in accordance with claim 1, wherein the pressurized air heat exchanger (THX) forms a mechanical unit with the supply air heat exchanger (OHX) and is separate from it on the pressurized air side.

6. A system in accordance with claim 1, wherein the supply air heat exchanger (OHX) and the pressurized air heat exchanger (IHX) are separate mechanically and on the pressurized air side.

7. A system in accordance with claim 1, wherein a bypass line is provided which can be closed by means of a valve (TBPV) and which connects the inlet of the pressurized air heat exchanger (THX) on the pressurized air side to its outlet on the pressurized air side.

8. A system in accordance with claim 1, wherein a bypass line is provided which can be closed by a valve (OBPV) and which connects the inlet of the supply air heat exchanger (OHX) on the pressurized air side to its outlet on the pressurized air side.

9. A system in accordance with claim 1, wherein the compressor is made in one or more stages; and/or one or more compressors are provided.

10. A system in accordance with claim 1, wherein a line is provided by means of which the outlet air of the heat exchangers (OHX, THX) on the low pressure side can be discharged to ambient or can be guided into a ram air passage of an aircraft air-conditioning system.

11. A system in accordance with claim 1, wherein a valve (TIV) is provided by which the air flow supplied to the turbine (T) can be changed or blocked.

12. A system in accordance with claim 1, wherein a valve (OSOV) is provided by which the air flow supplied to the compressor (C) can be changed or blocked.

13. A system in accordance with claim 1, wherein the compressor (C) and the turbine (T) form a shaft device with a common shaft.

14. A system in accordance with claim 13, wherein the shaft device has a drive motor (M) to drive the compressor (C).

15. A system in accordance with claim 13, wherein the shaft device and the heat exchangers (OHX; THX) form a common mechanical unit or are mechanically separate.

16. A method for the preparation of air in an aircraft with the system of claim 1, wherein the air is compressed in the compressor (C), the compressed air is cooled on the pressurized air side of the supply air heat exchanger (OHX) and then supplied to the system (OBIGGS) or unit which is to be supplied with pressurized air, the cooling of the air compressed in the compressor (C) takes place by the air which is supplied to the turbine (T) by the pressurized air supply separate from the air supply of the compressor (C), expanded in it and supplied to the low pressure side of the supply air heat exchanger (OHX), and the turbine performance created on the expansion being utilized at least in part to drive the compressor (C).

17. A method in accordance with claim 16, wherein cabin exhaust air is compressed in the compressor (C).

18. A method in accordance with claim 16, wherein cooled or non-cooled pressurized air is supplied to the turbine (T) from an engine or from an auxiliary unit.

19. A method in accordance with claim 16, wherein the pressurized air supplied to the turbine (T) is cooled in the pressurized air heat exchanger (THX) prior to the entry into the turbine (T).

20. A method in accordance with claim 16, wherein the turbine outlet air for the cooling of the air compressed in the compressor (C) first flows through the supply air heat exchanger (OHX) and subsequently flows through the pressurized air heat exchanger (THX) to cool the pressurized air supplied to the turbine (T).

21. A method in accordance with claim 16, wherein the outlet air of the heat exchangers on the low pressure side is discharged to ambient or is introduced into the ram air passage of an aircraft air-conditioning system.

22. A method in accordance with claim 16, wherein the compressor (C) is additionally driven by a motor on a low pressure of the pressurized air supplied to the turbine (T).

23. A method in accordance with claim 16, wherein an operating mode is provided to ensure a minimum temperature of the pressurized air supplied to the system (OBIGGS) or unit, in which operating mode air compressed in the compressor (C) is guided from the inlet side on the pressurized air side to the outlet side of the supply air heat exchanger (OHX) on the pressurized air side while at least partly bypassing the supply air heat exchanger (OHX).

24. A method in accordance with claim 16, wherein an operating mode is provided to increase the turbine inlet temperature, in which operating mode the pressurized air is guided from the inlet side on the pressurized air side to the outlet side of the pressurized air heat exchanger (THX) on the pressurized air side while at least partly bypassing the pressurized air heat exchanger (THX).

25. A method in accordance with claim 16, wherein an operating mode is provided for the limitation of the turbine inlet pressure, in which operating mode the pressurized air flow supplied to the turbine (T) is restricted.

26. A system in accordance with claim 1, wherein a hot-air side of the pressurized air heat exchanger (THX) is disposed upstream of the turbine (T).

27. A system in accordance with claim 26, wherein a cold-air side of the pressurized air heat exchanger (THX) is disposed downstream of the turbine (T).

* * * * *